June 30, 1964    W. D. HOFER    3,139,145
LEAF SPRING MOUNTING FOR CULTIVATOR SHANKS
Filed Jan. 2, 1963
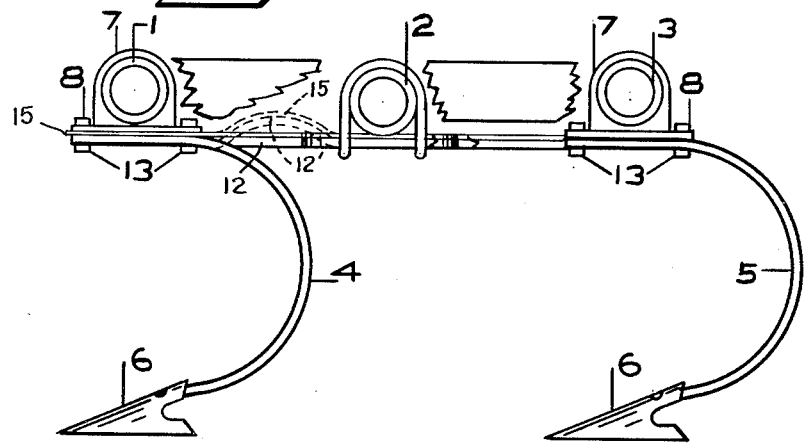
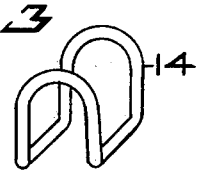
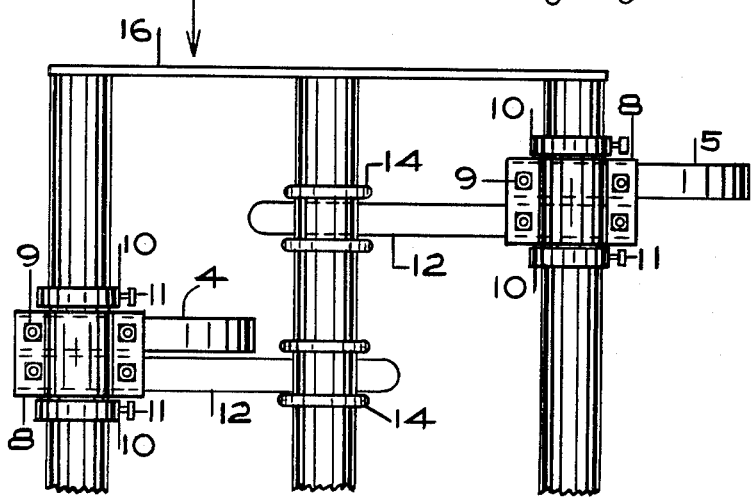

United States Patent Office 3,139,145
Patented June 30, 1964

3,139,145
LEAF SPRING MOUNTING FOR CULTIVATOR SHANKS
Walter David Hofer, Brocket, Alberta, Canada
Filed Jan. 2, 1963, Ser. No. 248,983
1 Claim. (Cl. 172—711)

This invention relates to cultivator shank spring mountings, having particular reference to use of a flat steel spring opposing upward movement of the shank.

In the art to which the invention relates, shanks carrying soil cultivating elements are mounted on frame cross bars of a cultivator, and springs are used to hold the shanks with their attached soil cultivating elements in working relation to the ground. In these coiled springs, either expansion or compression type are anchored in the cultivator frame and attached to the shanks. When an obstruction, such as an embedded stone, is encountered by a shank cultivating element the shank may rise to allow the cultivating element to clear the obstruction. But in the use of coiled springs and the like there is considerable side play necessitating overlap of the cultivating elements to avoid missing weeds in cultivating.

The present invention is designed to cut down this overlap by the use of flat steel springs anchored to cultivating cross bars and opposing upward movement of the cultivator shanks, so that when an obstruction is encountered by the soil working element on the shank the spring bends in an arc that allows the shank to rise in clearing the obstruction. These flat steel springs have no side play in cushioning the shanks and largely eliminate side play in the shanks when taken in conjunction with the mounting for the shanks as herein provided, so that overlapping of the cultivating elements to avoid missing weeds as a result of side play is reduced to a minimum, and the same clearance may be obtained for the shanks.

This results in considerable reduction in overall width of the cultivator to work the same area as covered by cultivators using coiled springs or the like, the reduction amounting to as much as a third for the same number of cultivating elements, which means a corresponding reduction in weight and draft, and a reduction in cost.

The essential features and advantages of the invention will become apparent by reference to the accompanying description taken in conjunction with the drawings.

In the drawings, wherein is illustrated a preferred embodiment of the invention, FIG. 1 is a side view of a section of a cultivator showing the cross bars and shanks, including springs opposing upward movement of the shanks, with the springs shown broken away for convenience of illustration, and also indicating a reinforcing spring leaf for one of the shanks, the bending of the leaf springs being indicated by dashed lines.

FIG. 2 is a top plan view of the showing in FIGURE 1, with the cross frame bars shown broken away, and the reinforcing spring leaf omitted.

FIG. 3 is a side perspective of a leaf spring clamp.

Having reference to the drawings, at 1, 2 and 3 are indicated tubular frame cross bars of a two row cultivator, on the bars 1 and 3 of which would be mounted front and rear rows of shanks, of which shanks 4 and 5 are shown, carrying cultivator elements 6. These shanks would be arranged staggered and spaced to give complete coverage by the soil working elements of the soil being worked.

Each of the shanks is attached to a bearing holder 7 that is mounted free to turn axially on a cross bar, the holders including a flange 8 to which the cultivator shanks are attached by bolts 9. The bearing holders would be held against lateral movement on the cross bars by collars 10 secured by set screws 11.

In side by side relation with the shanks are mounted flat steel springs 12 attached to the flanges 8 by bolts 13. These springs are engaged free to slide in the lower ends of clamps 14 on the center cross bar 2.

The cross bars 1, 2 and 3 would be connected at the ends, as by a bar 16 at each end.

In the use of the device, when a soil working element strikes an obstruction requiring the shank carrying the element to rise in clearing the obstruction, this rising movement of the shank flexes its attached spring 12, bending the spring in an arc, as indicated by the dashed lines 12′ in FIGURE 1, the spring on release of the soil working element by the obstruction restores the shank to its normal position and holds it in working relation to the ground, any movement up or down being opposed by the spring, so that even cultivating results, the cultivator shank being held against lateral sway by the bearing holder 10, these holders being held against endwise movement on the cross bars by the collars 10.

The cultivator can be increased as to width by using longer cross bars for the frame. To give greater strength to the leaf spring against upward movement of the shank a thin leaf, as at 15 in FIGURE 1, could be added to each spring.

This type of two row cultivator, in view of the permissible spacing of the shanks with very little overlap of the soil working elements is adapted, by shifting the collars 10, for use with seeder or fertilizer attachments.

Having thus particularly described my invention, what I claim and wish to secure by Letters Patent is:

In a cultivator including front and rear parallel cross bars and an intermediate cross bar parallel therewith, shanks bearing holders mounted free to turn axially on the front and rear cross bars, cultivator shanks fixed to the bearing holders and rearwardly extending, flat steel springs fixed to the bearing holders, the springs on the rear cross bar bearing holders extending forwardly and the springs on the front cross bars extending rearwardly, and clamps on the intermediate cross bar in which the spring extensions are engaged free to slide endwise therein but are held against vertical movement.

References Cited in the file of this patent

UNITED STATES PATENTS

| 434,100 | Thramer | Aug. 12, 1890 |
| 2,688,909 | Waterstreet | Sept. 14, 1954 |

FOREIGN PATENTS

| 746,485 | Germany | Aug. 8, 1944 |